(12) United States Patent
Khmelev et al.

(10) Patent No.: US 12,231,567 B1
(45) Date of Patent: Feb. 18, 2025

(54) SYSTEM AND METHOD FOR STRUCTURE AUTHENTICATION USING NFTS

(71) Applicant: United Services Automobile Association (USAA), San Antonio, TX (US)

(72) Inventors: Yevgeniy Viatcheslavovich Khmelev, San Antonio, TX (US); Gregory Meyer, San Antonio, TX (US); Seth E. Ethington, Mckinney, TX (US); Benjamin D. Ethington, Savannah, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 143 days.

(21) Appl. No.: 18/085,326

(22) Filed: Dec. 20, 2022

Related U.S. Application Data

(60) Provisional application No. 63/292,670, filed on Dec. 22, 2021.

(51) Int. Cl.
  *H04L 29/06* (2006.01)
  *G06F 21/45* (2013.01)
  *G06K 19/06* (2006.01)
  *H04L 9/32* (2006.01)

(52) U.S. Cl.
  CPC .......... *H04L 9/3213* (2013.01); *G06F 21/45* (2013.01); *G06K 19/06037* (2013.01); *H04L 2209/60* (2013.01)

(58) Field of Classification Search
  CPC ....... H04L 9/3213; H04L 9/085; H04L 63/10; H04L 63/0807; H04L 63/20; G06F 21/45
  USPC .......................................................... 726/20
  See application file for complete search history.

(56) References Cited

U.S. PATENT DOCUMENTS

| | | | |
|---|---|---|---|
| 2019/0366475 A1* | 12/2019 | Scarselli | G06Q 30/0185 |
| 2022/0083585 A1* | 3/2022 | Evans | G06N 20/00 |

\* cited by examiner

*Primary Examiner* — Longbit Chai
(74) *Attorney, Agent, or Firm* — Fletcher Yoder P.C.

(57) ABSTRACT

A structure authentication system includes a sensor configured to sense identifying features of a three-dimensional (3D) printed structure and generate identifying feature data based on the identifying features, as well as a processor configured to receive, from the sensor, the identifying feature of the 3D printed structure. The processor is also configured to analyze the identifying feature data along with a non-fungible token (NFT) database that correlates a plurality of NFTs to a plurality of identifying feature data to determine whether the 3D printed structure is associated with an NFT within the NFT database. Additionally, the processor is configured to query a blockchain to determine whether the NFT is authentically associated with the 3D printed structure. The processor is also configured to, in response to determining that the NFT is authentically associated with the 3D printed structure, send a notification to a user device indicating that the 3D printed structure is authentic.

20 Claims, 3 Drawing Sheets

SYSTEM AND METHOD FOR STRUCTURE AUTHENTICATION USING NFTS

CROSS-REFERENCE TO RELATED APPLICATION

The present application claims benefit of and priority to U.S. Provisional Patent Application Ser. No. 63/292,670, titled "SYSTEM AND METHOD FOR STRUCTURE AUTHENTICATION USING NFTS," which was filed on Dec. 22, 2021, and which is herein incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Three-dimensional (3D) printing is an increasingly common method for manufacturing residential homes and other structures. Designs for 3D printed structures are often owned by an architect or a company. Sometimes 3D printed structures are manufactured based on designs (e.g., blueprints) without permission from the owner of the designs. It is often difficult to tell the difference between an authentic structure manufactured with the approval of the design owner and a structure manufactured without approval. Therefore, it is desirable to have a system and method for determining the authenticity of a 3D printed structure.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a structure authentication system includes a sensor configured to sense identifying features of a three-dimensional (3D) printed structure structure and generate identifying feature data based on the identifying features, as well as a processor configured to receive, from the sensor, the identifying feature of the 3D printed structure. The processor is also configured to analyze the identifying feature data along with a non-fungible token (NFT) database that correlates a plurality of NFTs to a plurality of identifying feature data to determine whether the 3D printed structure is associated with an NFT within the NFT database. Additionally, the processor is configured to query a blockchain to determine whether the NFT is authentically associated with the 3D printed structure. The processor is also configured to, in response to determining that the NFT is authentically associated with the 3D printed structure, send a notification to a user device indicating that the 3D printed structure is authentic.

In another embodiment, a method includes receiving, from a sensor, data concerning identifying feature data of a 3D printed structure, and analyzing, via a controller, the data along with a non-fungible token (NFT) database and determining that the 3D printed structure is associated with an NFT within the NFT database. The method also includes querying, via the controller, a blockchain to determine that the NFT is authentically associated with the 3D printed structure, and in response to determining that the NFT is authentically associated with the 3D printed structure via the blockchain, sending, via the controller, a notification to a user device indicating that the 3D printed structure is authentic.

In yet another embodiment, a tangible, non-transitory, computer-readable medium, comprising computer-readable instructions that, when executed by one or more processors, cause the one or more processors to receive data concerning at least one identifying feature of a 3D printed structure. The one or more processors may also analyze the data along with a non-fungible token (NFT) database to determine whether the 3D printed structure is associated with an NFT within the NFT database, query a blockchain to determine whether the NFT is authentically associated with the 3D printed structure, and, in response to determining that the NFT is authentically associated with the 3D printed structure, send a notification to a user device indicating that the 3D printed structure is authentic.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
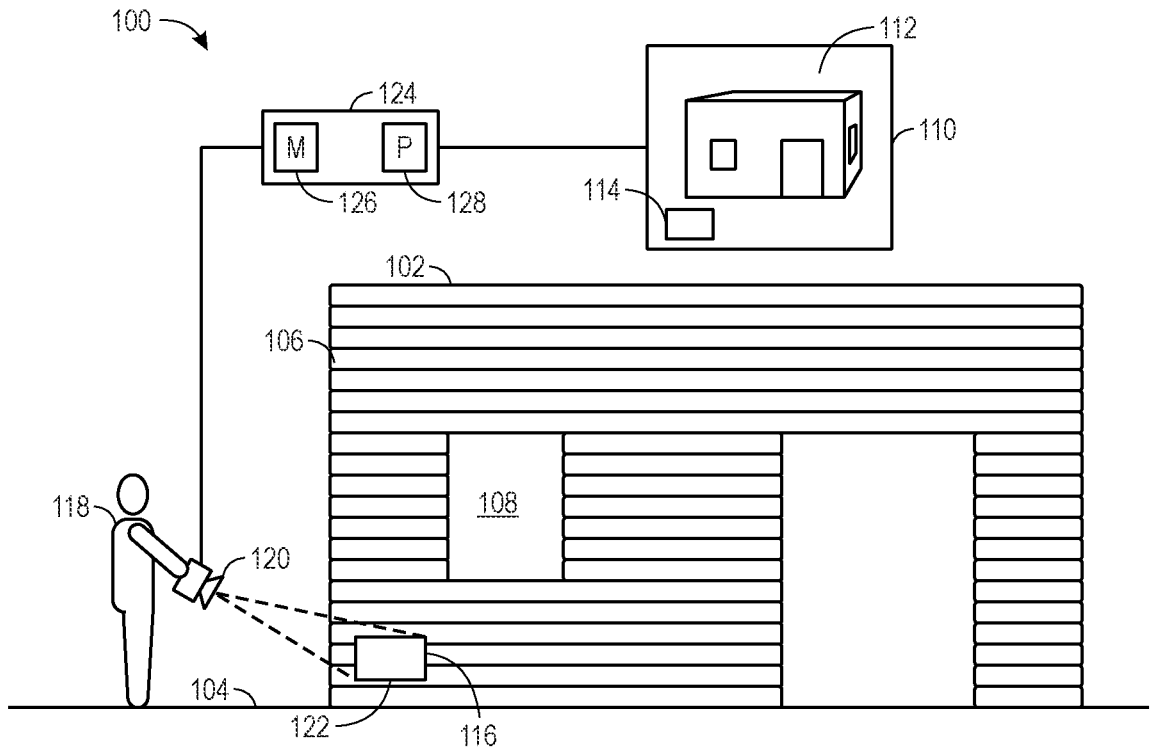
FIG. 1 is a schematic representation of a system for authenticating a three-dimensional (3D) structure using NFTs, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Alongside traditional construction, new methods for manufacturing buildings and other structures are emerging. One such method is three-dimensional (3D) printing. Large 3D printing apparatuses may layer construction materials (e.g., concrete, insulation, sealant, metal) to automatically construct a building without substantial human intervention. A 3D printing apparatus may construct a building based on a digital blueprint. In fact, a digital blueprint may include instructions for 3D printing a structure defined by the digital blueprint. Digital blueprints may be the intellectual property of an architect that drafted the blueprints, a builder, or another entity. Consequently, the owner of the blueprint may sell licenses for third parties to manufacture structures using the blueprint.

Non-fungibles tokens (NFTs) have emerged as a type of digital media that may be associated with an owner. NFTs may be any piece of digital media (e.g., a two-dimensional image, a 3D model, a sound file) and are associated with an owner via a blockchain. Once set, the blockchain may be queried to verify that the associated piece of digital media belongs to the owner. Accordingly, NFTs may be useful for verifying whether a user is authorized to utilize a digital blueprint for a 3D printing operation. The present embodiments are directed toward a system and method for verifying whether a 3D printed structure was authorized using NFTs.

With this in mind, FIG. 1 is an illustration of a system 100 for authenticating a three-dimensional (3D) structure using NFTs. The system 100 may include a 3D printed structure 102. The structure 102 may be a single family residential home, an apartment complex, an office building, a storage facility, a road, a paved walking path, a bridge, organic material (e.g., a 3D printed organ), or any other structure. The structure 102 may be composed of numerous materials (e.g., concrete, asphalt, clay, adobe, wood filament, sealant, insulation, magnetic material) layered on the ground 104 (or some other support or base). Various parts of the structure 102 may be composed of different materials. For example, a 3D printing apparatus may manufacture walls 106 using concrete. However, windows 108 may be manufactured from a 3D printable acrylic. In one embodiment, the 3D printing apparatus may print different parts of the structure 102 composed of different materials all in one continuous printing operation. In another embodiment, the 3D printing apparatus may print different parts of the structure 102 composed of different materials in separate printing operations.

The 3D printing apparatus may manufacture the structure 102 based on a blueprint 110. The blueprint 110 may be a visual file comprising dimensions, materials, a tool path for the 3D printing apparatus, infill patterns, and other pieces of data for printing the structure 102. The blueprint may belong to an owner (e.g., an architect who designed the blueprint 110, an architecture firm, an investor). The owner may own intellectual property rights to the blueprint 110, and may sell licenses for use in 3D printing operations by third parties. The owner may desire a way to ensure that properly licensed structures based on the blueprint 110 are distinguishable from unlicensed structures based on pirated copies of the blueprint 110. Toward this end, the owner may own a non-fungible token (NFT) comprising the blueprint 110 and editable metadata 114. The editable metadata 114 may comprise data for printing an identifying feature 116 into the structure 102 during a 3D printing operation. The identifying feature may be an infill pattern, a serial number, bar code, or quick response (QR) code visibly printed onto a surface of the walls 106, a radio-frequency identification (RFID) chip comprising authentication data, or another readable feature that may be used to verify that the structure 102 is an authentic structure printed using a license sold by the owner. The 3D printing apparatus may print the identifying feature 116 into the structure 102 based on the editable metadata 114. The 3D printing apparatus may also manufacture the structure 102 with a slit or other receptacle for the insertion of an RFID chip. In one embodiment, the identifying feature 116 may be a QR code that is composed of material of differing density (i.e., "white" portions of the QR code are composed of 3D printed material with normal infill, while "black" portions of the QR code are composed of 3D printed material with a denser infill) to facilitate detection via certain measurements (e.g., via ultrasound). In another embodiment, the identifying feature may be a magnetic signature. The 3D printing apparatus may insert the magnetic signature by placing magnetic material is specific points of the structure 102 during manufacturing. In yet another embodiment, the structure 102 is an organic structure and the identifying feature may be a DNA sequence in a protein scaffold. In yet another embodiment, the identifying feature may be a serial number in microscopic print. The user 118 may utilize a microscope to capture the identifying feature. Alternatively, the identifying feature 116 (e.g., the infill pattern) may be located in a portion of the structure 102 composed of transparent or translucent material (e.g., clear plastic, glass). The identifying feature may be a holographic feature. In this case, a combined two or more angled views of the holographic feature may fully identify the structure 102. For example, the identifying feature 116 may be a holographic item that displays a QR code from a first angle and a bar code from a second angle. In another embodiment, the identifying feature 116 may be a degradable piece of material. The degradable piece of material may be analyzed to determine a state of decomposition. The state of decomposition may indicate an age (e.g., construction date) of the structure 102. The 3D printing apparatus may print multiple identifying features around the structure 102.

The identifying feature 116 may be unique and associated with the NFT comprising the blueprint 110 along with other identifying data (e.g., a location of the structure) to facilitate authentication of the structure 102 as corresponding to the blueprint 110. In some embodiments, the identifying feature 116 may be an indication that the structure 102 is inauthentic. For example, during a 3D printing operation the 3D printing operation may detect that the 3D printing operation is not authorized. In response, the 3D printing apparatus may print the identifying feature 116 so that it indicates the inauthenticity of the structure 102.

A user 118 may operate a device 120 (e.g., a sensor, such as a sensor of a smart phone or portable computing device) to capture data regarding the identifying feature 116. The device 120 may be configured to identify features of 3D printed structures. The user 118 may be a property owner, an employee of a construction company, or any individual associated with the 3D printed structure 102. The device 120 may be a device (e.g., a camera, a cellular camera phone, an RFID scanner) configured to capture data to identify an identifying feature. For example, the user 118 may utilize a cellular camera phone to scan a QR code or input a serial number printed on the structure 102. In another example, the user 118 may use an RFID scanner to scan an RFID chip. In yet another example, the material of the structure 102 may be a plastic that is opaque to the human eye, but transparent on the infrared spectrum. The user 118 may utilize a camera outfitted with a filter (e.g., an infrared filter) that allows the camera to capture an image of the infill pattern of the structure 102. The wall 106 may also have a removable surface panel 122 that may be removed to reveal the infill pattern of the structure 102. The user 118 may remove the removable surface panel 122 and use a visible-spectrum camera to capture an image of the infill pattern. The user 118 may utilize the captured data of the identifying feature 116 to verify the authenticity of the structure 102 via a controller 124.

The system 100 may include a controller 124. The controller 124 may include memory 126 and a processor 128. The processor 128 may be any type of computer processor or microprocessor capable of executing computer-executable code. The processor 128 may also include multiple processors that may perform the operations described below. The memory 126 may be any suitable article of manufacture that can serve as media to store processor-executable code, data, or the like. These articles of manufacture may represent computer-readable media (e.g., any suitable form of memory or storage) that may store the processor-executable code used by the processor 128 to perform the presently disclosed techniques. The memory 126 may also be used to store data (as described), various other software applications for analyzing the data, and the like. The memory 126 may represent non-transitory computer-readable media (e.g., any suitable form of memory or storage) that may store the processor-executable code used by the processor 128 to perform various techniques described herein. It should be noted that non-transitory merely indicates that the media is tangible and not a signal.

The controller 124 may be used for a variety of processes. First, the controller 124 may be used to catalogue that a licensed structure was manufactured. For example, a manufacturer may be granted access to the NFT 112 comprising the blueprint 110 and the metadata 114 after purchasing a license from the owner. In one embodiment, the manufacturer may receive an address for the NFT 112 after purchasing a license. The address of the NFT may change periodically or after each purchase to discourage pirating. In another embodiment, the manufacturer may be given temporary access to a digital wallet (e.g., a software wallet, a hardware wallet) after purchasing a license. The identifying feature 116 may change periodically or after every purchase. The controller 124 may edit the metadata 114 to record the identifying feature and manufacturing details (e.g., date, time, location, material) following a licensed 3D printing operation. In another embodiment, the controller 124 may mint an additional NFT after a purchase. The additional NFT may comprise details of a manufactured structure (e.g., date, time, location, material, identifying feature, location of the identifying feature on the 3D printed structure). The additional NFT may be used to verify that the structure is authentic once the structure is manufactured.

As an example, a manufacturer may purchase a license to 3D print the structure 102 based on the blueprint 110. The owner of the blueprint 110 may then give the manufacturer access to a digital wallet containing the NFT 112, giving the manufacturer access to the blueprint 110 as well as the metadata 114 containing instructions for printing the identifying feature 116 into the walls 106. The controller 124 may communicate with a blockchain associated with the NFT 112 to begin the manufacturing process. The controller 124 may cause a 3D printing apparatus to manufacture the structure 102 with the identifying feature 116. After the structure 102 is manufactured with the identifying feature 116, the controller may be used for a verification operation. For example, the user 118 may remove the removable surface panel 122 and use a camera (e.g., the device 120 or an aspect of the device 120) to capture an image of the identifying feature 116, which is an infill pattern (e.g., located in a specific aspect of a structure, such as a support column). The controller 124 may then search an NFT ledger (e.g., a database) for an NFT comprising metadata that matches the identifying feature 116 captured by the device 120. Other data may also be taken into account, such as relative location, a captured image of the associated structure, an overall image of the structure, and so forth In certain embodiments, the controller 124 may narrow the database search using other information concerning the structure 102 (e.g., manufacturing date, material, builder). If the controller 124 identifies an NFT whose metadata corresponds to the identifying feature 116, the controller 140 may send an indication to the device 120 that the structure 102 is authentic. If the controller 124 does not identify an NFT whose metadata corresponds to the identifying feature 116, or if the identifying feature corresponds to an NFT that indicates inauthenticity, the controller 124 may send an indication to the device 120 that the structure 102 is not authentic. In certain embodiments, the controller 12 may not identify a corresponding NFT due to a damaged identifying feature 116. In this embodiment, the controller 124 may identify a corresponding NFT based on an undamaged portion of the identifying feature 116 and additional information (e.g., construction date, location coordinates). Additionally, the controller 124 may send an indication to a device (e.g., the device 120) prompting the user 118 to use an additional, undamaged identifying feature 116 located elsewhere on the structure 102. In certain embodiments, the controller 124 may send an indication to a device associated with the owner of the NFT 112 indicating the existence of an inauthentic structure based on the blueprint 110. The controller 124 may also contact authorities in response to identifying an inauthentic structure. A method for authenticating structures using NFTs is detailed below. Once authentication is confirmed or inauthenticity is confirmed, this information may be provided to an insurance program that can adjust aspects of insurance related to the property, such as a premium. Likewise, such information may be employed to adjust loan information based on the structure (either authentic or not) being collateral.

Figure 2:
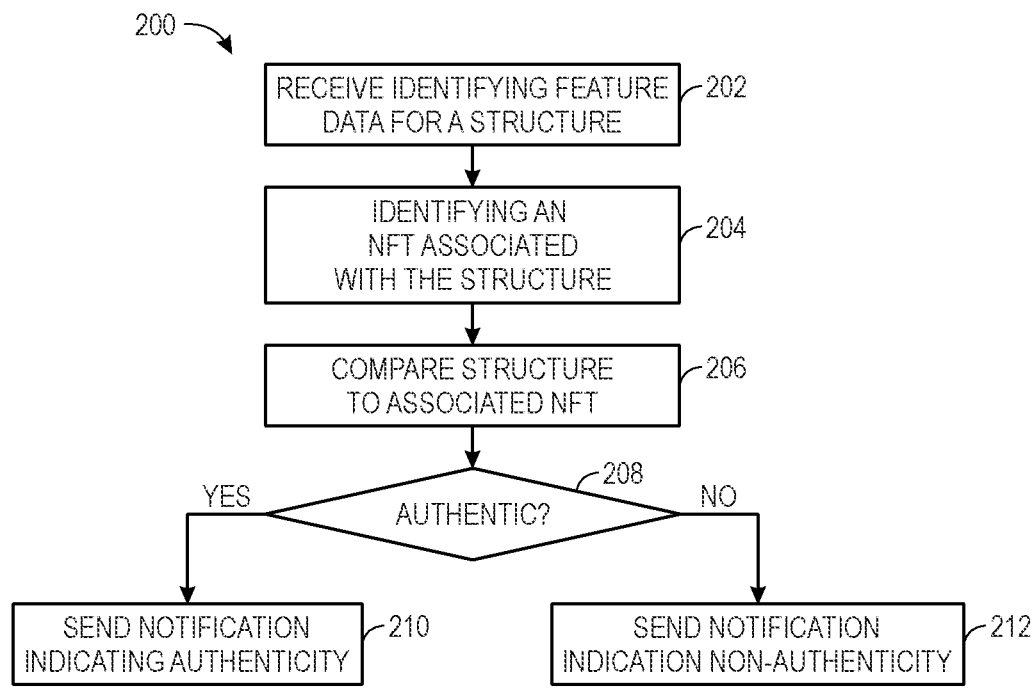
FIG. 2 is a block diagram illustrating a method for authenticating a three-dimensional (3D) structure using NFTs, in accordance with embodiments described herein.

FIG. 2 is a block diagram illustrating a method 200 for authenticating a 3D structure using NFTs in accordance with present embodiments. Although the following description of the method 200 is described in a particular order, it should be noted that the method 200 is not limited to the depicted order; and, instead, the method 200 may be performed in any suitable order. This method 200 (or algorithm) may be performed by the controller 124, in accordance with present embodiments.

At block 202, the controller 124 receives identifying feature data for a structure (e.g., the structure 102). The identifying feature data may be a numerical input of a serial number, an image of an infill pattern, an NFT address corresponding to a QR code or an RFID chip, or the like. The controller 124 may receive the identifying feature 116 from the device 120. The device 120 may capture identifying feature data in response to an input from the user 118. The user 118 may capture the identifying feature data in response to a request from a realtor, the owner of the blueprint 110, or out of personal motivation. The identifying feature data may also comprise a design model of the structure 102. In one embodiment, the controller 124 receives identifying feature data of multiple identifying features.

At block 204, the controller 124 identifies an NFT associated with the structure 102. That is, the controller 124 determines if a design model of the structure 102 matches a design model found in the blueprint 110 of the NFT 112. In one embodiment, the controller 124 may receive a request to compare a certain NFT (e.g., the NFT 112) with a certain structure (e.g., the structure 102) along with an address for the NFT 112. In this case, the controller 124 may compare a blueprint of the NFT with a design model of the identifying data. If the design model of the identifying data matched the design model in the blueprint, the controller 124 determines that the NFT and the structure are associated. In another embodiment, the controller 124 may receive the identifying feature data and search for an associated NFT. The controller 124 may search an NFT ledger or a digital wallet (e.g., a software wallet, a hardware wallet) to identify an NFT comprising data also found in the identifying feature data. For example, the controller 124 may receive identifying feature data comprising data indicating that the structure is based on a certain design model. The controller 124 may then identify an NFT within the digital wallet comprising a blueprint that matches the design model. In some embodiments, the user 118 may input details pertaining to the structure 102 (e.g., architectural style, date of construction, location). The controller may search for an NFT that includes identical details. The identified NFT may comprise metadata comprising a serial number, a manufacturing date, and a structure location.

At block 206, the controller 124 compares the structure 102 to an identified NFT (e.g., the NFT identified at block 204). That is, the controller 124 may query a blockchain associated with the NFT to determine if the structure 102 was properly licensed (i.e., authentically associated with the structure), or was manufactured without a license. The controller 124 may compare the identifying feature data received at block 202 to the metadata of the NFT identified at block 204. For example, the controller 124 may compare metadata comprising a serial number, a manufacturing date, and a structure location from the NFT 112 to identifying feature data comprising a serial number, a manufacturing date, and a structure location. A comparison between the metadata and the identifying feature data may determine whether the structure associated with the identifying feature data was authentically manufactured with a license. In another embodiment, the controller 124 may receive the identifying feature data and search for an NFT with matching metadata without having identified an NFT associated with the structure. For example, the controller 124, in response to receiving identifying feature data, may search a digital wallet for an NFT comprising metadata that matches the identifying feature data. The controller 124 may also compare ownership history of the metadata to ownership data in the identifying feature data At block 208, the controller determines whether the structure 102 is authentically associated with the NFT identified at block 204. If the identifying feature data received at block 202 matches the metadata of the NFT identified at block 204, the method proceeds to block 210. If the identifying feature data received at block 202 does not match the metadata of the NFT identified at block 204, the method proceeds to block 212.

At block 210, the controller 124 sends a notification indicating that the structure 102 is authentic. That is, the notification indicates that the structure 102 is properly licensed. The controller 124 may send the notification to the device 120, a device associated with the owner of the NFT 112, an online database that catalogues authentic structures, and/or another device. The notification may comprise a certificate of authenticity, a web address for a web page including authenticity information, and the like. The certificate of authenticity may include a date of construction, a date of authentication, a design blueprint, an ownership record, and the like.

At block 212, the controller 124 may send a notification indicating that the structure 102 is not authentic. That is, the notification indicates that the structure 102 is not properly licensed. The controller 124 may send the notification to the device 120, a device associated with the owner of the NFT 112, and/or another device. The notification may comprise a message indicating that the structure is unlicensed. The controller 124 may also send an alert to the owner of the NFT 112 including an indication that an unlicensed structure has been found as well as location information (e.g., an address). Additionally, the indication may include ownership data for the structure 102. The controller 124 may utilize the ownership data to determine an identity of a user that manufactured the inauthentic structure.

Figure 3:
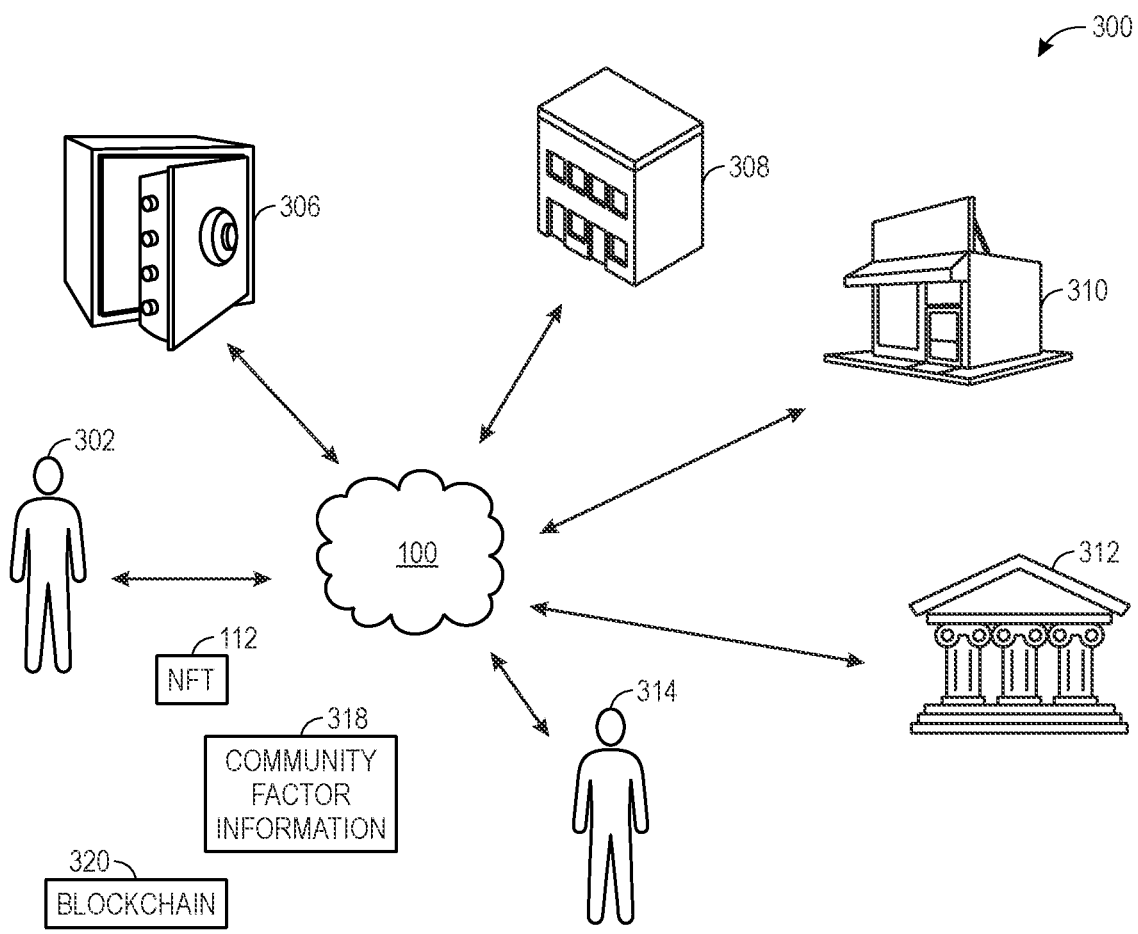
FIG. 3 is a schematic illustration of an environment in which a non-fungible token management system may operate, in accordance with an embodiment.

FIG. 3 illustrates an example environment 300 in which the system 100 may operate, in accordance with embodiments described herein. A user 302 can interact with and access the NFT management system 304 via a user device, such as a mobile device that is implemented as a computing device as provided herein. The system 100 may provide NFT management services to a large number of different organizations or individuals, and may act as a clearinghouse for various types of NFT transactions. For example, the NFT system 100 may permit one or more NFT transactions of the user 302, a cloud storage system 306, companies and institutions 308, merchants and retailers 310, financial institutions 312, and other users 314. The system 100 facilitates interactions with one or more NFTs 112, which may be stored in the system 100, identified via the system 100, accessed via the system 100, and/or authenticated by the system 100.

In some embodiments, the NFT system 100 may facilitate user authentication, which is a technology area that deals with identifying individuals in a system (such as a country, a network, or an enterprise) and controlling access to resources, such as managed NFTs 112, within that system by associating user rights and restrictions with user-associated NFTs and permitting user transactions with NFTs that are owned by the user or that are permitted by an owner of an NFT, which may be facilitated in the system 100. In general, the NFT system 100 may maintain user information for the user 302, companies and institutions 308, merchants and retailers 310, financial institutions 312, other users 314, and the like. In addition, the system facilitates and maintains NFT identification information and NFT digital data, which can be under user control.

Some of the features that may be provided by the NFT system 100 includes access to NFT transactions from a mobile application, an embedded application operating on the user device 105, or a web application. In certain embodiments, the NFT system 100 may securely store identity attributes of an NFT 112 on a blockchain.

As provided herein, an NFT 112 is a token used to represent ownership of one or more unique items. Accordingly, the NFT 112 may refer to a blockchain address or hash associated with the NFT 112 that includes a fixed number of alphanumeric characters generated from a public and private key pair. The NFT 112 may also include digital raw or compressed data representative of the NFT 112 and that is associated with a unique blockchain address. As provided herein, the system 100 may store the identifier hash, while the digital data of the NFT 112 is stored elsewhere, e.g., the digital data of the NFT (e.g., the image data, the audio data) is stored off-chain. In embodiments, the system 100 also stores the digital data of the NFT 112. The NFT 112 may also include metadata (e.g., a JSON file) associated with the digital NFT data. Ownership of the NFT 112 may include ownership of hex values encoding transaction elements, such as function names, parameters, and return values, and that are used to access NFT data.

The NFT 112 may, in embodiments, be a type of cryptocurrency that uses smart contracts. However, in contrast to digital coins, which are fungible, each NFT 112 is digitally unique such that no two NFTs 112 are the same. For example, even for items that are multiples of one another (e.g., multiple digital copies of an artwork), each NFT 112 would still have a unique identifier (e.g., a bar code), with only one owner. The intended scarcity of the NFT 112 is set by the creator. A creator may intend to make each NFT 112 completely unique to create scarcity or produce several thousand replicas (each replica having its own unique, non-fungible identifier, similar to an artist print marked as 1/10). Every NFT 112 has an owner of public record that can be verified. In embodiments, NFT creators can retain ownership rights over their own work, and claim resale royalties directly. Thus, the owner of the NFT 112 may have financial arrangements or royalty arrangements that are dictated within the smart contracts of the NFT record.

Creation or minting of an NFT 112 involves confirmation of the NFT 112 as an asset on the blockchain, and the owner's account balance is updated to include that asset. This makes it possible for the NFT 112 to then be traded or verifiably owned. The transactions that confirm the above are added to a block on the chain. The block is confirmed by everyone in the network as correct. This consensus removes the need for intermediaries because the network verifies the NFT 112 and ownership. As provided herein, the NFT 112 may be created on the Ethereum blockchain. In an embodiment, the NFT 112 is part of the ERC-721, ERC-1155, and/or EIP-2309 standard.

The NFT system 100 may employ a blockchain infrastructure to perform NFT management utilized in connection with digital transactions such as NFT minting (e.g., NFT creation), authentication, storage, or financial transactions (e.g., NFT purchasing or exchange, valuation, insurance). In general, blockchains are continuously growing lists of records (e.g., blocks), which are linked and secured using cryptography, for example. By using a blockchain infrastructure that enables the functionality of smart contracts, the methods and systems described herein allow a persistent, replicated, public, and automated database for transactions that involve NFTs.

As such, the embodiments described herein include methods and systems for deployment, maintenance, and interaction with the distributed ledgers and smart contracts to facilitate NFT management for the purpose of performing digital transactions (e.g., financial transactions, exchanges of information). The embodiments described herein may include blockchain techniques, as well as the terminals and servers that operate blockchain nodes, as described herein. Technical advantages of the embodiments described herein also include the use of public and/or private blockchains to perform automated, trusted operations for the purpose of conducting digital transactions involving NFTs 112. The systems described herein allow the performed operations to be transparent and tamper-proof and, thus, may increase the accuracy of, and security with, conducting digital transactions. Moreover, the techniques described herein may also reduce network congestion by, for example, reducing the amount of data transferred between entities that communicate using a network or between two different portions of one entity communicating using a network.

Referring again to FIG. 3, in certain embodiments, the blockchain 320 may be a public or private ledger of all transactions that have been executed in one or more contexts (e.g., negotiable instrument transactions, digital currency transactions, access determinations, instances of providing access, reviews, etc.). The blockchain 320 may grow as completed blocks are added with a new set of transactions by the NFT system 100. In certain embodiments, a single block is provided from multiple transactions (e.g., multiple statements of authenticity for the NFT 112). In general, blocks are added to the blockchain 320 in a linear, chronological order by one or more computing devices in a peer-to-peer network of interconnected computing devices that execute a blockchain protocol. In short, the peer-to-peer network can be described as a plurality of interconnected nodes, each node being a computing device that uses a client to validate and relay transactions. Each node maintains a copy of the blockchain 320, which is automatically downloaded to the node upon joining the peer-to-peer network. The blockchain protocol provides a secure and reliable method of updating the blockchain 320, copies of which are distributed across the peer-to-peer network, without use of a central authority.

The infrastructure described above may be accessed by an application program interface (API). The API may be accessed from an access node. The API may provide users with an interface to the NFTs 112. The API may be loaded as an interface in an access node, or a resource available on the internet that may be accessed using a network application (e.g., a browser) in the access node of the system 100. The API may convert the state and the functions of an online NFT transaction to binary code for storage and execution by miners of the blockchain 320. The API may also convert (e.g., compile) transactions or information requests to a binary message that may be transmitted to the blockchain 320 for execution by miners.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a particular transaction. The blockchain 320 enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain 320). In certain embodiments, the blockchain 320 may also employ other protocols. In this context, the work is a task that is difficult for any single node (e.g., computing device) in the peer-to-peer network to quickly complete, but is relatively easy for a node (e.g., computing device) to verify.

The peer-to-peer network includes miners (e.g., computing devices) that add blocks to the blockchain 320 based on the blockchain protocol. In general, multiple miners validate transactions that are to be added to a block, and compete (e.g., perform work, as introduced above) to have their block added to the blockchain 320. Validation of transactions includes verifying digital signatures associated with respective transactions. For a block to be added to the blockchain 320, a miner must demonstrate a proof of work before their proposed block of transactions is accepted by the peer-to-peer network, and is added to the blockchain 320. In certain embodiments, the blockchain protocol includes a proof of work scheme that is based on a cryptographic hash function (CHF). In general, the CHF receives information as input, and provides a hash value as output, the hash value being of a predetermined length. In certain embodiments, the hash value is a one-way hash value, in that the hash value cannot be "un-hashed" to determine what the input was. In certain embodiments, the blockchain protocol may require multiple pieces of information as input to the CHF. For example, the input to the CHF may include a reference to the previous (most recent) block in the blockchain 320, details of the transaction(s) that are to be included in the to-be-created block, and a nonce value (e.g., a random number used only once).

Multiple nodes may compete to hash a set of transactions and provide the next block that is to be added to the blockchain 320. In certain embodiments, the blockchain protocol provides a threshold hash to qualify a block to be added to the blockchain 320. For example, the threshold hash may include a predefined number of zeros (0s) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain 320. Each miner provides the reference to the previous (most recent) block in the blockchain 320, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain 320. Consequently, the respective miner's block is broadcast across the peer-to-peer network. All other miners cease work (because one miner was already successful), and all copies of the blockchain 320 are updated across the peer-to-peer network to append the block to the blockchain 320. Each miner may be required to produce hundreds or thousands of hash values, before any one miner provides a qualifying hash value (e.g., at least the first four characters of the hash value are each zero).

In certain embodiments, the distributed ledger (or blockchain 320) system may include one or more sidechains. A sidechain may be described as a blockchain 320 that validates data from other blockchains 120. In certain embodiments, a sidechain enables ledger assets (e.g., a digital currency) to be transferred between multiple blockchains 120. In certain embodiments, the blockchain 320 may be a public blockchain, such that data stored on the blockchain 320 is generally accessible. In other embodiments, the blockchain 320 may be a private blockchain, such that the stored data is accessible only to authorized individuals and/or processes on the blockchain 320. In certain embodiments, the blockchain 320 may also be a hybrid of public and private blockchains. For example, the NFT system 100 may utilize a privately managed, but publicly readable blockchain 320. In this manner, some identity information about a user may be stored in a sidechain. In certain embodiments, the NFT system 100 may store multiple different NFTs 112 associated with respective different users 102.

Figure 4:
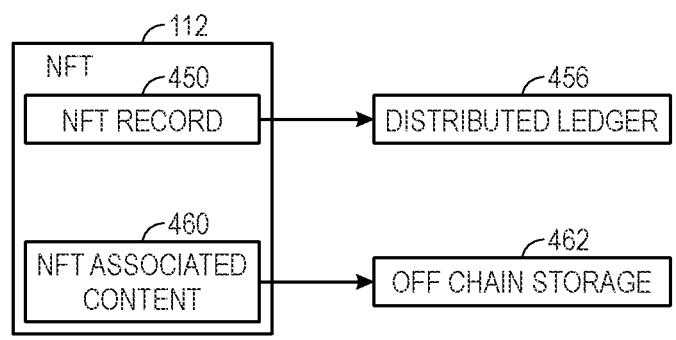
FIG. 4 is a block diagram of a non-fungible token storage arrangement, in accordance with an embodiment.

FIG. 4 shows an example NFT 112 and storage arrangement that includes an NFT record 450, e.g., a token, such as a hash, that is stored and validated in a distributed ledger 456, e.g., a blockchain record. The NFT record 450 includes ownership information and transaction histories. The NFT record 450, as discussed herein, includes a unique identification that uniquely identifies NFT associated content 460, which can be one or more files that includes the digital data of the NFT 112, such as image files, video files, audio files, game item files, or any suitable NFT associated content 460. The NFY associated content 460 may include metadata. While the NFT record 150 is stored in the distributed ledger 456, e.g., a blockchain, storing the NFT associated content 460 in a distributed ledger format may be prohibitively expensive, particularly for larger files. Accordingly, NFT associated content 460 can be stored in an off-chain storage 462. The location of the off-chain storage 462 at the time the NFT 112 was minted can be specifically referred to in the NFT record 450. For example, the NFT record 450 can include a url link to the NFT associated content 460.

In certain embodiments, the NFT 112 may include seed information that populates variables for a fixed NFT generation algorithm, e.g., an image or audio generation algorithm. Each seed can be a hexadecimal string generated in a random or pseudorandom manner at the time the token is minted. However, the algorithm is fixed, such that using a specific seed provides identical result each time. In embodiments, the seed can be stored as part of the NFT record 450 on the distributed ledger 456. The algorithm can be stored as part of the NFT record 450 and/or stored in off-chain storage 462. In this manner, the NFT associated content 460 can be generated on demand using the algorithm and the seed. This may permit greater on-chain storage capabilities, without requiring storage of large data files that are expensive to mint. The seed, and algorithm in embodiments, can be relatively small and inexpensive to record in the distributed ledger 456.

Off-chain storage 462 solutions are typically set by the minter of the NFT 112, and can vary in quality and security. For example, the off-chain storage can be a website, and the NFT record 450 can refer to an HTTP address. However, website access can be shut down if the account holder abandons the site. Further, the owner of the website can alter or replace the original NFT associated content 460. Other storage solutions may be longer-term or more stable, such as storage in InterPlanetary File System (IPFS) or Arweave. In IPFS storage, any added file is given its own unique identifier that acts as a permanent record of the file. Therefore, NFT associated content 460 stored off-chain in an IPFS storage may have a unique token identifier as part of the NFT record 450 and may also have a storage record, such as a content identifier (CID), as part of the stored file in the off-chain storage 462. Accordingly, different NFTs 112 may have different data persistence or mutability based on the quality of the off-chain storage 462.

The NFT purchaser may wish to store the NFT 112 privately to create scarcity of the NFT associated content 460. In an embodiment, the NFT system 100 can include off-chain storage 462 with controlled or user-set access for managed NFTs 112. Thus, the NFT system 100 addresses uncertainties caused by an unsecured link between the NFT record 450 and the NFT associated content 460.

Further, the purchaser of the NFT 112 may be at arms length from the original creator (minter) of the NFT 112 and may not have any way of contacting the creator to alter the storage arrangements or authenticate the NFT associated content 460. Disclosed embodiments of the NFT system 100 include improved authentication of the NFT associated content 460 for downstream purchasers of the NFT 112, which in turn may permit controlled storage of an authenticated copy of the NFT associated content 460. A user of the NFT system 100 may wish to control storage of a purchased NFT 112 or have access to an authenticated copy of the associated content 160 that is stored in a secure storage location.

Figure 5:
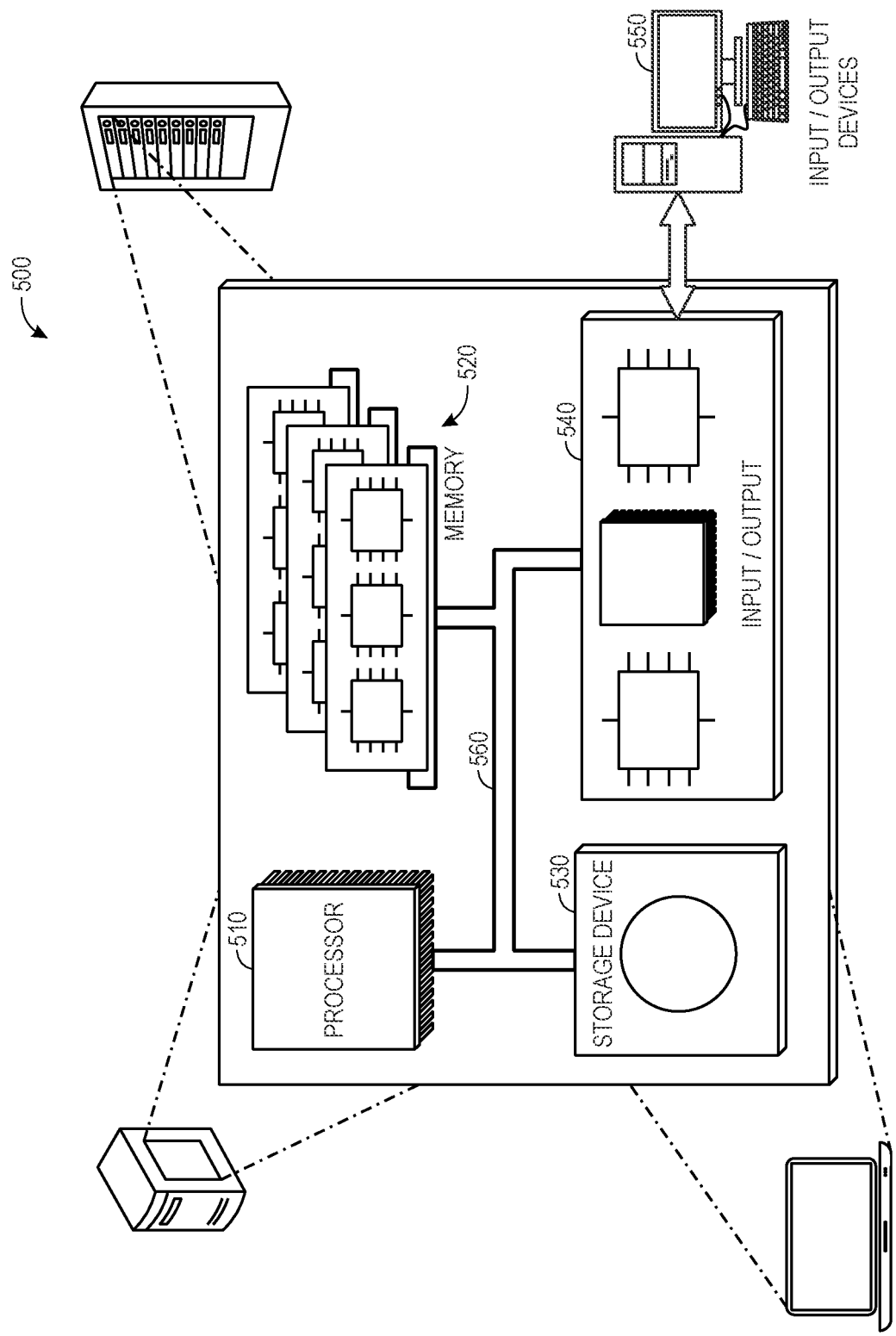
FIG. 5 is a schematic illustration of an example computing system, in in accordance with an embodiment.

FIG. 5 illustrates an example computing system 500 that the embodiments described herein may use to perform their respective operations. The system 500 may be used for any of the operations described with respect to the various embodiments described herein, including the NFT system 100 described herein. For example, the system 500 may be included, at least in part, in one or more of computing device(s) or system(s) described herein. In certain embodiments, the system 500 may include one or more processors 510, one or more memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

In certain embodiments, the processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

In certain embodiments, the memory 520 may store information within the system 500. In certain embodiments, the memory 520 includes one or more computer-readable media. The memory 520 may include any number of volatile memory units, any number of non-volatile memory units, or both volatile and non-volatile memory units. The memory 520 may include read-only memory, random access memory, or both. In certain embodiments, the memory 520 may be employed as active or physical memory by one or more executing software modules.

In certain embodiments, the storage device(s) 530 may be configured to provide (e.g., persistent) mass storage for the system 500. In certain embodiments, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In certain embodiments, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 510 and the memory 520 may be supplemented by, or incorporated into, one or more application-specific integrated circuits (ASICs).

In certain embodiments, the system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500 or may be external on one or more computing devices of the system 500.

In certain embodiments, the system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-832 standard for serial ports, or with a version of the IEEE AA884 standard for parallel ports. As another example, the I/O interface(s) 540 may be configured to provide a connection over Universal Serial Bus (USB) or Ethernet. In certain embodiments, the I/O interface(s) 540 may be configured to provide a serial connection that is compliant with a version of the IEEE AA994 standard.

In certain embodiments, the I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Certain embodiments of the present disclosure include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with embodiments of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments of the system 500 may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 500 that includes a back-end component, e.g., as a data server, or that includes a middleware component, e.g., an application server, or that includes a front-end component, e.g., a client computer having a graphical user interface or a web browser through which a user may interact with an with the system 500, or any appropriate combination of one or more such back-end, middleware, or front end components. The components of the system 500 may be interconnected by any appropriate form or medium of digital data communication, e.g., a communication network. Examples of communication networks include a local area network ("LAN") and a wide area network ("WAN"), e.g., the Internet.

In certain embodiments, the computing system 500 may include clients and servers. A client and server are generally remote from each other and typically interact through a communication network. The relationship of client and server arises by computer programs running on the respective computers and having a client-server relationship to each other.

In certain embodiments, an application provides an interface for user interaction, such as a web interface or other graphical user interface (GUI). The application may interact with the smart contract(s). The interface may also be an application programming interface (API) that enables other processes to securely interact with the smart contract(s). The interface may enable a user to specify permission information, including individuals authorized to their information and/or constraints on such access. The interface may also enable the user to view information such as transaction history that is stored on the distributed ledger. In certain embodiments, a history may provide an auditable history of transactions, which are mediated by the smart contract(s) on the distributed ledger. Additionally, it should be noted that the smart contract(s) executing on a distributed ledger may make access authorization decisions based on permission information stored on the distributed ledger. In certain embodiments, the distributed ledger may be a blockchain, such as blockchain 320.

Embodiments of the present disclosure are also directed to secure device management. More particularly, embodiments of the present disclosure are directed to managing a network of devices using information and/or computer programming code on a distributed ledger system such as a blockchain. The computer programming code may include smart contracts, which may also be described as self-executing contracts, blockchain contracts, digital contracts, and/or chain code. As used herein, a smart contract refers to computer programming code executed by a distributed ledger system. For instance, smart contracts may refer to distributed programs, or distributed applications that can be used to perform the transactions and recordation in the blockchain infrastructure. Smart contracts may include data structures that may keep track of the state of the smart contract, as well as smart contract functions to interact with the smart contract. As the interactions with the smart contracts may only take place through the smart contract functions, the integrity of the state of the smart contract may be preserved. For example, smart contracts may be utilized in the exchange of information regarding users. As another example, smart contracts may be utilized in conjunction with financial transactions, such as payments or loans.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A structure authentication system comprising:
    a sensor configured to sense identifying features of a three-dimensional (3D) printed structure and generate identifying feature data based on the identifying features; and
    a processor device configured to:
    receive, from the sensor, the identifying feature data;
    analyze the identifying feature data along with a non-fungible token (NFT) database that correlates a plurality of NFTs to a plurality of identifying feature data to determine whether the 3D printed structure is associated with an NFT within the NFT database;
    query a blockchain to determine whether the NFT is authentically associated with the 3D printed structure, wherein the authenticated printed structure composed of different materials and the authentication is at least based on properly licensed structures; and
    in response to determining that the NFT is authentically associated with the 3D printed structure, send a notification to a user device indicating that the 3D printed structure is authentic.

2. The system of claim 1, wherein is the sensor is configured to sense an RFID chip as an identifying feature.

3. The system of claim 1, wherein the sensor is configured to sense an infill pattern as an identifying feature.

4. The system of claim 1, wherein the sensor is a camera of the user device.

5. The system of claim 4, wherein the camera comprises a filter for identifying infill patterns of the 3D printed structure.

6. The system of claim 1, wherein the sensor is an RFID scanner.

7. The system of claim 1, wherein determining that the NFT is authentically associated with the 3D printed structure comprised determining that a user associated with the 3D printed structure possesses a license to utilize a blueprint of the NFT to construct the 3D printed structure.

8. The system of claim 1, wherein the sensor is configured to sense a QR code visibly printed onto a surface of the structure as an identifying feature.

9. The system of claim 1, wherein the processor is configured to, in response to determining that the NFT is not authentically associated with the 3D printed structure, send a notification to the user device indicating that the 3D printed structure is not authentic.

10. The system of claim 9, wherein an identifying feature of the 3D printed structure is a feature indicative of the structure being inauthentic, as designated in the blockchain.

11. A method for structure authentication, comprising:
receiving, from a sensor, data associated with identifying feature data of a three-dimensional (3D) printed structure;
analyzing, via a controller, the data along with a non-fungible token (NFT) database and determining whether the 3D printed structure is associated with an NFT within the NFT database;
querying, via the controller, a blockchain to determine that the NFT is authentically associated with the 3D printed structure, wherein the authenticated printed structure composed of different materials and the authentication is at least based on properly licensed structures; and
in response to determining that the NFT is authentically associated with the 3D printed structure via the blockchain, sending, via the controller, a notification to a user device indicating that the 3D printed structure is authentic.

12. The method of claim 11, comprising:
receiving, from the sensor, additional data concerning additional identifying feature data of an additional 3D printed structure; and
analyzing, via the controller, the additional data along with the non-fungible token (NFT) database to determine that the additional 3D printed structure is associated with the NFT within the NFT database.

13. The method of claim 12, comprising:
querying, via the controller, the blockchain to determine that the NFT is not authentically associated with the additional 3D printed structure; and
in response to determining that the NFT is not authentically associated with the additional 3D printed structure via the blockchain, sending, via the controller, a notification to the user device indicating that the 3D printed structure is not authentic.

14. The method of claim 13, wherein the determination that the NFT is not authentically associated with the 3D printed structure is based on the identifying feature being damaged.

15. The method of claim 14, comprising sending, via the controller, an indication to the user device, wherein the indication comprises a prompt to send data concerning an undamaged identifying feature of the 3D printed structure.

16. A tangible, non-transitory, computer-readable storage medium, comprising computer-readable instructions that, when executed by one or more processors, cause the one or more processors to:
receive data associated with at least one identifying feature of a three-dimensional (3D) printed structure;
analyze the data along with a non-fungible token (NFT) database to determine whether the 3D printed structure is associated with an NFT within the NFT database;
query a blockchain to determine whether the NFT is authentically associated with the 3D printed structure, wherein the authenticated printed structure composed of different materials and the authentication is at least based on properly licensed structures; and
in response to determining that the NFT is authentically associated with the 3D printed structure, send a notification to a user device indicating that the 3D printed structure is authentic.

17. The computer-readable medium of claim 16, wherein the computer-readable instructions, when executed by the one or more processors, cause the one or more processors to, in response to determining that the NFT is not authentically associated with the 3D printed structure, send a notification to the user device indicating that the 3D printed structure is not authentic.

18. The computer-readable medium of claim 16, wherein the computer-readable instructions, when executed by the one or more processors, cause the one or more processors to interface with a sensor configured to detect the at least one identifying feature.

19. The computer-readable medium of claim 16, wherein the computer-readable instructions, when executed by the one or more processors, cause the one or more processors to analyze the data to determine a construction date of the 3D printed structure based on degradation of a material detected as the at least one identifying feature.

20. The computer-readable medium of claim 16, wherein the computer-readable instructions, when executed by the one or more processors, cause the one or more processors to coordinate with at least one sensor to detect an RFID chip at the at least one identifying feature.

* * * * *